United States Patent
Chang

(10) Patent No.: US 11,531,258 B2
(45) Date of Patent: Dec. 20, 2022

(54) LIGHT SOURCE MODULE AND PROJECTION DEVICE

(71) Applicant: Coretronic Corporation, Hsin-Chu (TW)

(72) Inventor: Jui Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/155,095

(22) Filed: Jan. 22, 2021

(65) Prior Publication Data
US 2021/0240064 A1    Aug. 5, 2021

(30) Foreign Application Priority Data
Feb. 3, 2020    (CN) .......................... 202010078294.5

(51) Int. Cl.
*G02B 27/14*    (2006.01)
*G02B 27/10*    (2006.01)
*G03B 21/20*    (2006.01)

(52) U.S. Cl.
CPC ....... *G03B 21/2013* (2013.01); *G02B 27/102* (2013.01); *G02B 27/14* (2013.01); *G03B 21/2033* (2013.01); *G03B 21/2066* (2013.01)

(58) Field of Classification Search
CPC ............ G03B 21/2013; G03B 21/2066; G02B 27/102; G02B 27/14
See application file for complete search history.

(56) References Cited

U.S. PATENT DOCUMENTS

2009/0122272 A1 *  5/2009  Silverstein ......... G02B 27/0972
                                                          353/20
2010/0302514 A1 * 12/2010  Silverstein ........... G02B 27/143
                                                          353/37
(Continued)

FOREIGN PATENT DOCUMENTS

CN    101833150       9/2010
CN    202008573      10/2011
(Continued)

OTHER PUBLICATIONS

"Office Action of China Counterpart Application", dated Dec. 28, 2021, p. 1 -p. 15.

*Primary Examiner* — Magda Cruz
(74) *Attorney, Agent, or Firm* — JCIPRNET

(57) ABSTRACT

A light source module configured to provide a light beam along a first direction is provided. The light source module includes first to third light source groups and first to fourth beam-combining devices, wherein each of a light exiting surface of the first light source group and a light exiting surface of the third light source group is not parallel to a light exiting surface of the second light source group. An emitted light of the first light source group is transmitted along the first direction after being reflected by the first and second beam-combining devices. An emitted light of the third light source group is transmitted along the first direction after being reflected by the third and fourth beam-combining devices. An emitted light of the second light source group is transmitted along the first direction and passes through the first and third beam-combining devices.

18 Claims, 10 Drawing Sheets

(56) References Cited

U.S. PATENT DOCUMENTS

| | | | | |
|---|---|---|---|---|
| 2012/0133903 A1* | 5/2012 | Tanaka | ............... | G03B 21/2066 |
| | | | | 353/31 |
| 2012/0275149 A1* | 11/2012 | Huang | ................. | G02B 27/102 |
| | | | | 362/235 |
| 2013/0135592 A1* | 5/2013 | Okuda | ................... | G03B 21/14 |
| | | | | 353/31 |
| 2016/0004149 A1* | 1/2016 | Chen | ...................... | G02B 27/14 |
| | | | | 362/241 |
| 2016/0116832 A1* | 4/2016 | Wang | ........................ | F21V 9/14 |
| | | | | 353/20 |
| 2017/0115554 A1 | 4/2017 | D'Oosterlinck et al. | | |
| 2017/0271837 A1 | 9/2017 | Hemenway et al. | | |
| 2019/0339602 A1* | 11/2019 | Pan | ................... | G03B 21/2033 |
| 2021/0278683 A1* | 9/2021 | Hou | ................... | G02B 19/0057 |

FOREIGN PATENT DOCUMENTS

| | | | | |
|---|---|---|---|---|
| CN | 102722075 | | 10/2012 | |
| CN | 102904161 | | 1/2013 | |
| CN | 103439857 | | 12/2013 | |
| CN | 207541400 | | 6/2018 | |
| CN | 211348976 | | 8/2020 | |
| EP | 1983763 | | 10/2008 | |
| EP | 2943719 | | 11/2015 | |
| JP | 2011043703 | | 3/2011 | |
| JP | 2011043703 A | * | 3/2011 | ............ G03B 21/14 |
| JP | 2016018208 | | 2/2016 | |
| KR | 20150123064 | | 11/2015 | |
| TW | 201128225 | | 8/2011 | |
| TW | 201616210 | | 5/2016 | |
| WO | WO-2016066022 A1 | * | 5/2016 | ............ G03B 21/20 |

\* cited by examiner

LIGHT SOURCE MODULE AND PROJECTION DEVICE

CROSS-REFERENCE TO RELATED APPLICATION

This application claims the priority benefit of China application no. 202010078294.5, filed on Feb. 3, 2020. The entirety of the above-mentioned patent application is hereby incorporated by reference herein and made a part of this specification.

TECHNICAL FIELD

The invention relates to an optical module and an optical device, and more particularly, relates to a light source module and a projection device.

BACKGROUND

A projection device is a display device for generating large image, and has been continuously improved with the evolution and innovation of technology. As the imaging principle of the projection device, an illumination beam generated by an illumination system is converted into an image beam by a light valve so then the image beam can be projected to a projection target (a screen or a wall surface) through a projection lens, so as to form projection image.

Further, in response to the market requirements for the projection device related to brightness, color saturation, service life, non-toxic environmental protection and the like, the illumination system has also been evolved into the most advanced laser diode (LD) source, all the way from the ultra-high-performance lamp (UHP lamp), light-emitting diode light-emitting diode (LED) and so on. In the current technological development, multiple blue laser diodes can be put together and combined into a multi-chip laser (MCL) light source. Accordingly, a density of laser light sources may be further increased, and the design difficulty can be greatly reduced.

However, fixed structures and routing areas are still to be provided on the back and the surroundings of the multi-chip laser light source. Consequently, in the current lighting system architecture, combination for multi-chip laser light sources will result in excessively large occupied areas, and problems of difficulty in heat dissipation. Moreover, there is a phenomenon of discontinuous alignment or unevenness of light beams between different light sources.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a light source module and a projection device, which can enable the light source module to take into account both good space utilization and good heat dissipation effect.

Other objects and advantages of the invention can be further illustrated by the technical features broadly embodied and described as follows.

To achieve one, a part, or all of the objects or other objects, an embodiment of the invention proposes a light source module, which is configured to provide a light beam along a direction. The light source module includes a first light source group to a third light source group and a first beam-combining device to a fourth beam-combining device, wherein each of a light exiting surface of the first light source group and a light exiting surface of the third light source group is not parallel to a light exiting surface of the second light source group. An emitted light of the first light source group is transmitted along the first direction after being reflected by the first beam-combining device and the second beam-combining device. An emitted light of the third light source group is transmitted along the first direction after being reflected by the third beam-combining device and the fourth beam-combining device. An emitted light of the second light source group is transmitted along the first direction and passes through the first beam-combining device and the third beam-combining device.

To achieve one, a part, or all of the above objectives or other objectives, another embodiment of the invention proposes a projection device, which includes a plurality of light source modules, an optical system, at least one light valve and a projection lens. Each of the light source modules is configured to provide a light beam along a first direction. Each of the light source modules includes a first light source group to a third light source group and a first beam-combining device to a fourth beam-combining device, wherein each of a light exiting surface of the first light source group and a light exiting surface of the third light source group is not parallel to a light exiting surface of the second light source group. An emitted light of the first light source group is transmitted along the first direction after being reflected by the first beam-combining device and the second beam-combining device. An emitted light of the third light source group is transmitted along the first direction after being reflected by the third beam-combining device and the fourth beam-combining device. An emitted light of the second light source group is transmitted along the first direction and passes through the first beam-combining device and the third beam-combining device. The optical system is disposed on transmission paths of the light beams, and configured to convert the light beams into an illumination beam. The at least one light valve is disposed on a transmitting path of the illumination beam, and configured to convert the illumination beam into an image beam. The projection lens is disposed on a transmission path of the image beam and configured to convert the image beam into a projection beam.

Based on the above, the embodiments of the invention have at least one of the following advantages and effects. In the light source module and the projection device of the invention, the first light source group, the second light source group and the third light source group are respectively disposed on different planes in space, so that each of the light exiting surface of the first light source group and the light exiting surface of the third light source group is not parallel to the light exiting surface of the second light source group. Accordingly, the first light source group to the third light source group may be provide the light beams from different positions in space, and transmit the light beams along the first direction by reflection or transmission effect of the beam-combining devices. As a result, the light source module may take into account both good space utilization and good heat dissipation effect.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
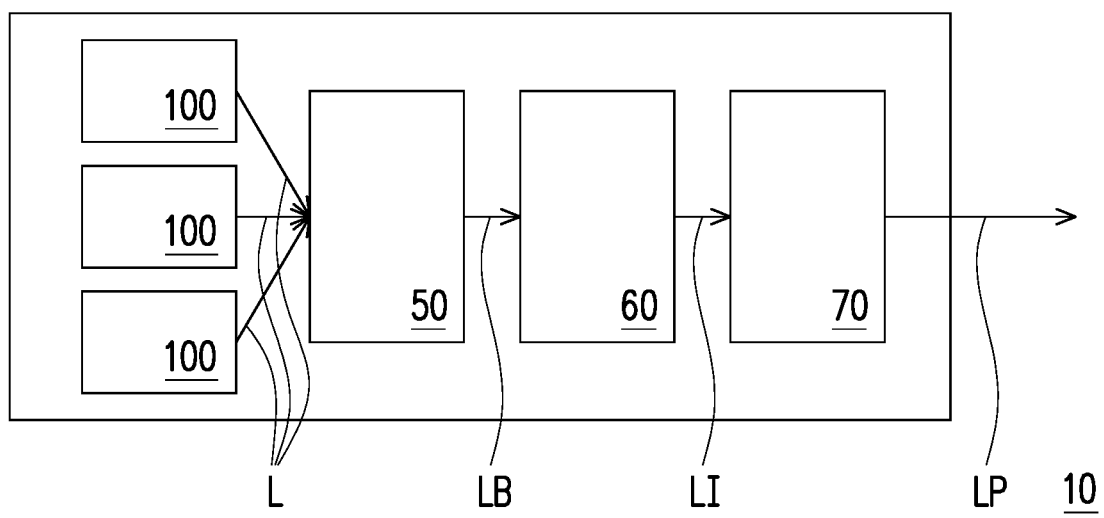
FIG. 1 is a schematic diagram of the projection device in an embodiment of the invention.

FIG. 1 is a schematic diagram of the projection device in an embodiment of the invention. Referring to FIG. 1, in this embodiment, a projection device 10 is configured to provide a projection beam LP. The projection device 10 includes a plurality of light source modules 100, an optical system 50, at least one light valve 60 and a projection lens 70. The light valve 60 is disposed on a transmitting path of the illumination beam LB and configured to convert the illumination beam LB into at least one image beam LI. The so-called illumination beam LB refers to a light beam provided to the light valve 60 by the optical system 50 at any time. The projection lens 70 is disposed on a transmission path of the image beam LI and configured to convert the image beam LI into a projection beam LP. The projection beam LP is projected to a projection target (not illustrated), such as a screen or a wall surface.

Figure 2A:
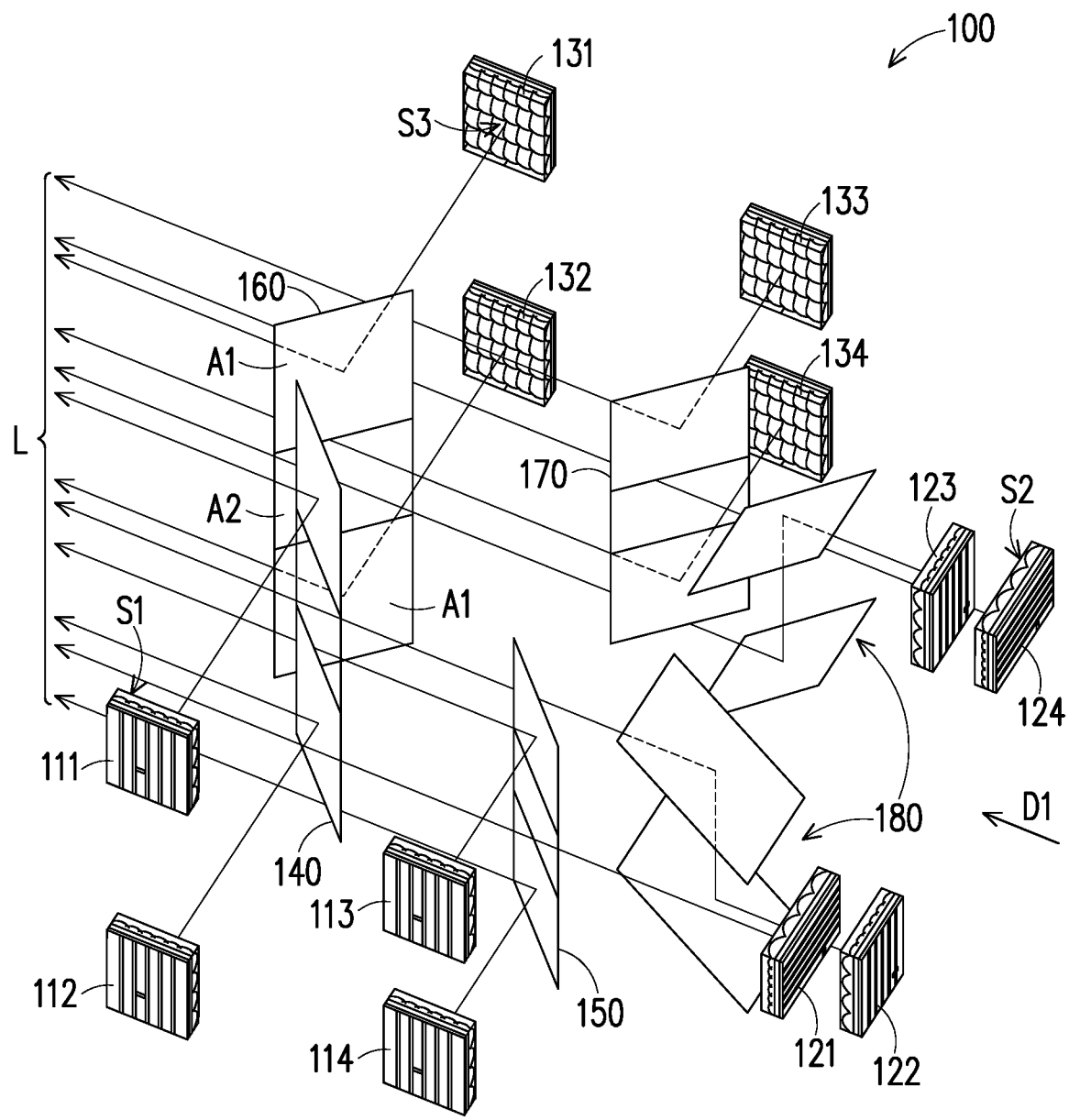
FIG. 2A is a 3D view of a light source module in an embodiment of the invention.

FIG. 2A is a 3D view of a light source module in an embodiment of the invention. Referring to FIG. 1 and FIG. 2A, specifically, in this embodiment, the optical system 50 is disposed on transmission paths of a plurality of light beams L provided by the light source modules 100, and configured to convert the light beams L into the illumination beam LB. For example, in this embodiment, the optical system 50 is formed by, for example, a combination of a wavelength conversion element, a light huniformizing element, a filter element, and a plurality of beam-splitting and beam-combining elements, and configured to provide the illumination beam LB having different wavelengths at the same time sequence or the illumination light beam LB having different wavelengths at different time sequences as an image light source. However, the invention is not limited to the number, type, or form of optical elements used in the optical system 50. Enough teaching, suggestion, and implementation illustration for aforesaid structures and embodiments thereof may be obtained with reference to common knowledge in the related art, which is not repeated hereinafter.

The light valve 60 is, for example, a reflective light modulator such as a liquid crystal on silicon panel (LCoS panel), a digital micro-mirror device (DMD) and the like. In certain embodiments, the light valve 60 may also be a transmissive light modulator such as a transparent liquid crystal panel, an electro-optical modulator, a maganeto-optic modulator, an acousto-optic modulator (AOM) and the like. Forms and types of the light valve 60 are not particularly limited by the invention. Enough teaching, suggestion, and implementation illustration for detailed steps and embodiments regarding how the light valve 60 converts the illumination beam LB into the image beam LI may be obtained with reference to common knowledge in the related art, which is not repeated hereinafter. In this embodiment, the number of the light valve 60 is one (e.g., the projection device 10 uses one digital micro-mirror device (1-DMD)), but may also be more than one in other embodiments. The invention is not limited in this regard.

The projection lens 70 includes, for example, a combination of one or more optical lens with refractive powers, such as various combinations among non-planar lenses including a biconcave lens, a biconvex lens, a concavo-convex lens, convexo-convex lens, a plano-convex and a plano-concave lens. In an embodiment, the projection lens 70 may also include a flat optical lens for projecting the image beam LI from the light valve 60 to the projection target in reflective or transmissive manner. Forms and types of the projection lens 70 are not particularly limited by the invention.

Moreover, in certain embodiments, the projection device 10 may also selectively include optical elements with concentration, refraction or reflection functions, which are used to guide the illumination beam LB emitted by the optical system 50 to the light valve 60, and used to guide the image beam LI emitted by the light valve 60 to the projection lens 70, so as to generate the projection beam LP. However, the invention is not limited in this regard.

Each of the light source modules 100 is configured to provide the light beam L along a first direction D1 to the optical system 50. It should be noted that the so-called first direction D1 refers to a direction in which each of the light source modules 100 transmits the light beam L to the optical system 50. For instance, in this embodiment, as the different optical source module 100 disposed in different positions may transmit the light beams L to different positions of the optical system 50 along different directions. In other words, the first direction D1 only indicates a last light exiting direction of each single light source module 100, that is, a facing direction of each of the light source modules 100.

For example, in this embodiment, the projection device 10 may have three light source modules 100, which respectively provide red light, blue light, and green light. Alternatively, in another embodiment, the three light source modules 100 respectively provide red light, blue light, and blue light. In another embodiment, the projection device 10 may include only one light source modules 100 that can provide red light, blue light, and green light. However, the invention is not limited to the number of the light source modules 100 or the types of wavelengths used in the projection device 10. Enough teaching, suggestion, and implementation illustration for aforesaid structures and embodiments thereof may be obtained with reference to common knowledge in the related art, which is not repeated hereinafter.

Figure 3:
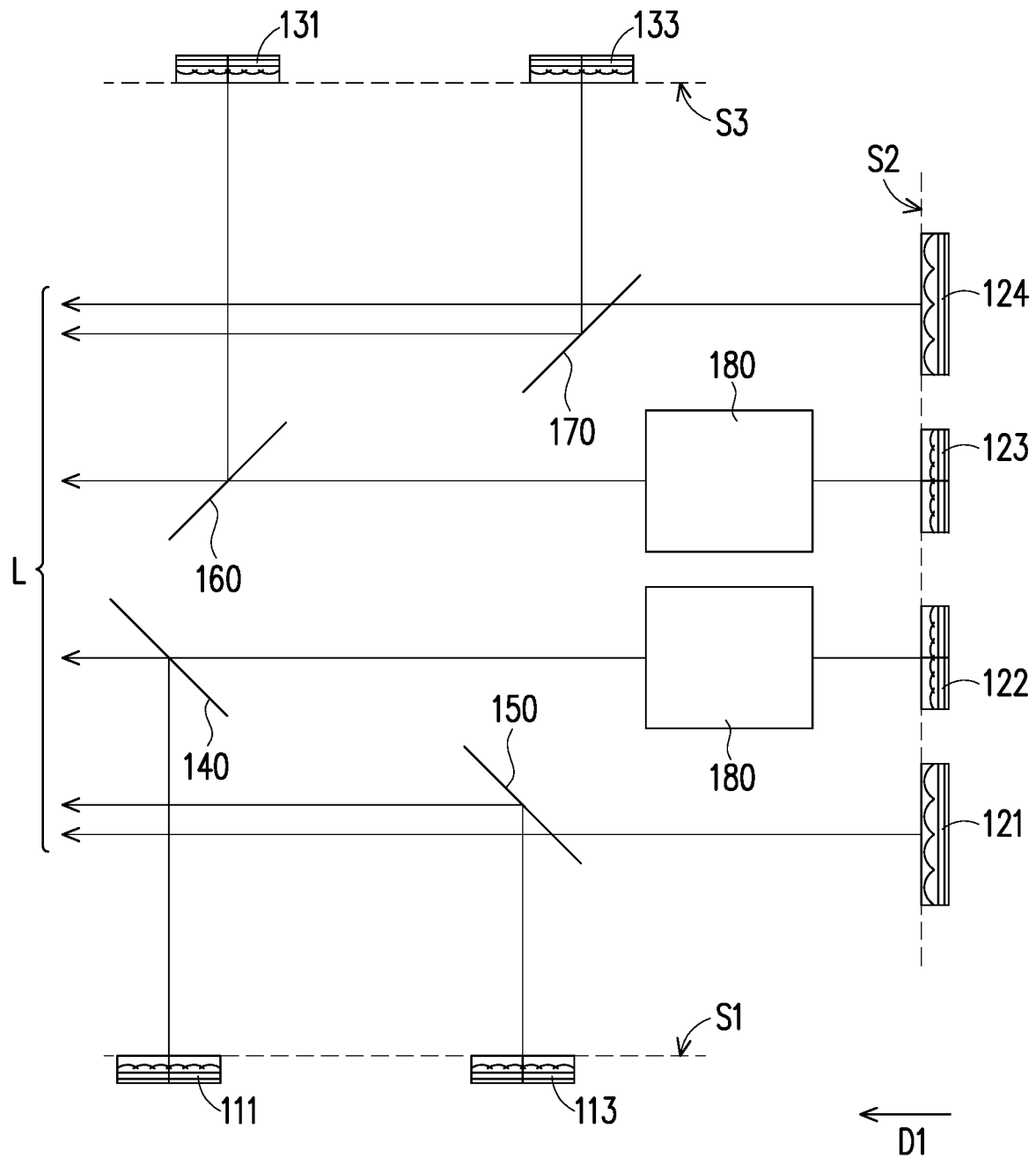
FIG. 3 is a top view of the light source module of FIG. 2A.
Figure 4:
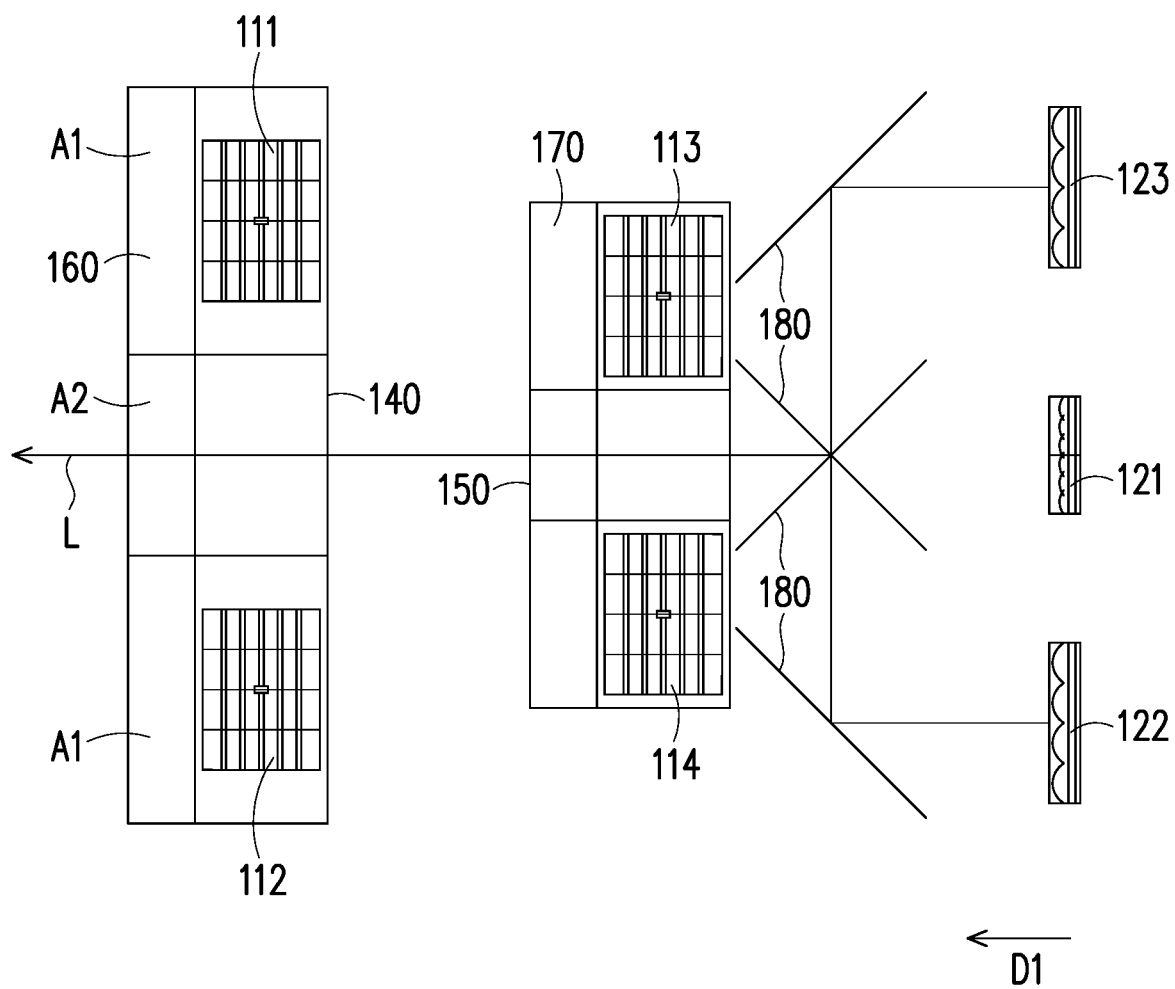
FIG. 4 is a side view of the light source module of FIG. 2A.
Figure 5:
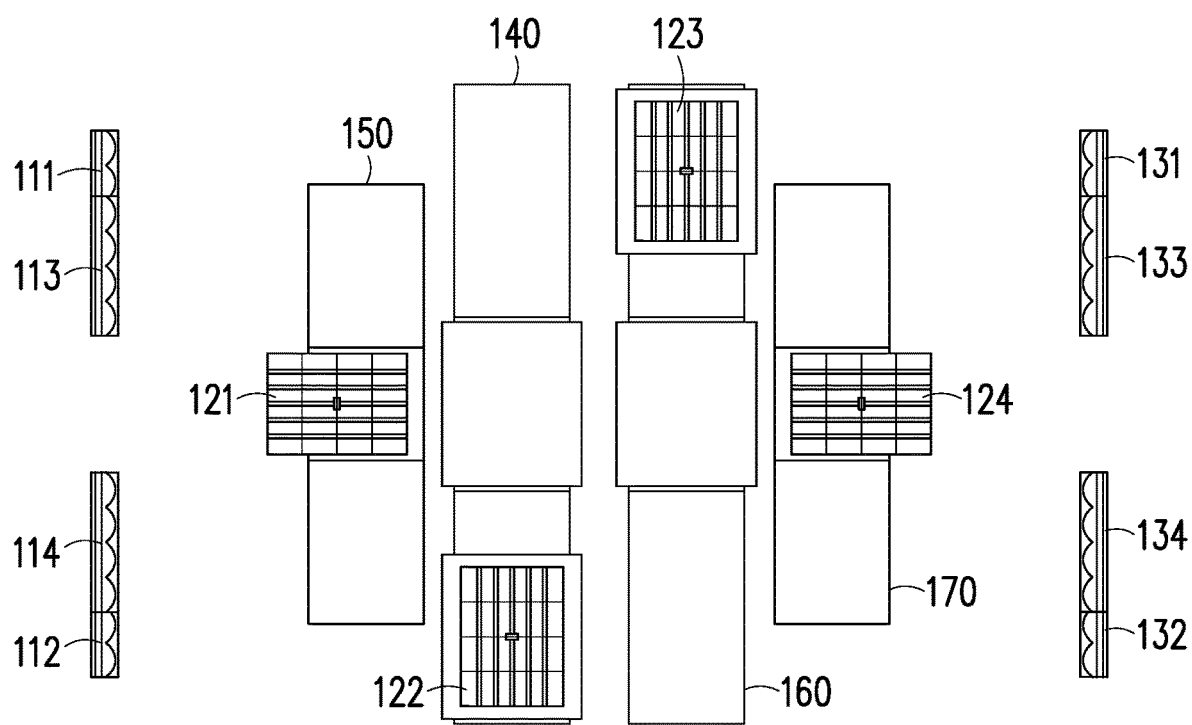
FIG. 5 is another side view of the light source module of FIG. 2A.

FIG. 3 is a top view of the light source module of FIG. 2A. FIG. 4 is a side view of the light source module of FIG. 2A. FIG. 5 is another side view of the light source module of FIG. 2A. Referring to FIG. 2A and FIG. 5 together, specifically, one light source module 100 includes a first light source group 110, a second light source group 120, a third light source group 130, a first beam-combining device 140, a second beam-combining device 150, a third beam-combining device 160 and a fourth beam-combining device 170. Each of the first light source group 110, the second light source group 120 and the third light source group 130 includes a plurality of light-emitting elements. The light-emitting element is composed of one or many laser diodes (LDs) or light emitting diodes (LEDs). In this embodiment, the first light source group 110 includes 4 light-emitting elements 111, 112, 113 and 114; the second light source group 120 includes 4 light-emitting elements 121, 122, 123 and 124; and the third light source group 130 includes 4 light-emitting elements 131, 132, 133 and 134. In certain embodiments, a number of the light-emitting elements included by each of the first light source group 110, the second light source group 120 and the third light source group 130 is 2 to 6, and a total number of the light-emitting elements of the first light source group 110 to the third light source group 130 is 12. However, the invention is not limited in this regard. Moreover, the invention does not limit the number of the light source groups and the beam-combining devices used in one light source module 100 and the number of light emitting elements used in each light source group. Enough teaching, suggestion, and implementation illustration for aforesaid structures and embodiments thereof may be obtained with reference to common knowledge in the related art, which is not repeated hereinafter.

The first beam-combining device 140, the second beam-combining device 150, the third beam-combining device 160 and the fourth beam-combining device 170 are configured to reflect or transmit the light beams L provided by the first light source group 110 to the third light source group 130. Here, projection positions of the first beam-combining device 140 and the third beam-combining device 160 on a reference plane perpendicular to the first direction D1 are located between projection positions of the second beam-combining device 150 and the fourth beam-combining device 170 on the reference plane. In this embodiment, each of the first beam-combining device 140 to the fourth beam-combining device 170 includes two reflective regions A1 and a transmissive region A2, and the transmissive region A2 is located between the two reflective regions A1. The two reflective regions A1 are configured to reflect an emitted light of the first light source group 110 or the third light source group 130, and the transmissive region A2 is configured to allow an emitted light of the second light source group 120 to be transmitted through. Therefore, this special design in space may be used to further reduce the number of reflective mirrors. In this embodiment, the emitted light of the first light source group 110 is transmitted along the first direction D1 after being reflected by the first beam-combining device 140 and the second beam-combining device 150. The emitted light of the third light source group 130 is transmitted along the first direction D1 after being reflected by the third beam-combining device 160 and the fourth beam-combining device 170. The emitted light of the second light source group 120 is transmitted along the first direction D1 and passes through the first beam-combining device 140 and the third beam-combining device 160.

Specifically, the light-emitting element 111 transmits the light beam L towards one of the reflective regions A1 of the first beam-combining device 140, and the light beam L is then reflected by the reflective region A1 so that the light beam L is transmitted along the first direction D1. The light-emitting element 112 transmits the light beam L towards another one of the reflective regions A1 of the first beam-combining device 140, and the light beam L is then reflected by the reflective region A1 so that the light beam L is transmitted along the first direction D1. The light-emitting element 113 transmits the light beam L towards one of the reflective regions A1 of the second beam-combining device 150, and the light beam L is then reflected by the reflective region A1 so that the light beam L is transmitted along the first direction D1. The light-emitting element 114 transmits the light beam L towards another one of the reflective regions A1 of the second beam-combining device 150, and the light beam L is then reflected by the reflective region A1 so that the light beam L is transmitted along the first direction D1, as shown by FIG. 3. Similarly, the light-emitting element 131 transmits the light beam L towards one of the reflective regions A1 of the third beam-combining device 160, and the light beam L is then reflected by the reflective region A1 so that the light beam L is transmitted along the first direction D1. The light-emitting element 132 transmits the light beam L towards another one of the reflective regions A1 of the third beam-combining device 160, and the light beam L is then reflected by the reflective region A1 so that the light beam L is transmitted along the first direction D1. The light-emitting element 133 transmits the light beam L towards one of the reflective regions A1 of the fourth beam-combining device 170, and the light beam L is then reflected by the reflective region A1 so that the light beam L is transmitted along the first direction D1. The light-emitting element 134 transmits the light beam L towards another one of the reflective regions A1 of the fourth beam-combining device 170, and the light beam L is then reflected by the reflective region A1 so that the light beam L is transmitted along the first direction D1, as shown by FIG. 3.

On the other hand, the light beam L is transmitted along the first direction D1 by the light-emitting element 121 and passes through the transmissive region A2 of the second beam-combining device 150. The light beam L is transmitted along the first direction D1 by the light-emitting element 124 and passes through the transmissive region A2 of the fourth beam-combining device 170. Further, in addition, the light source module 100 further includes two reflective mirror groups 180, which are configured to fold at least a part of the emitted light of the second light source group 120. Specifically, in the present embodiment, the reflective mirror group 180 is composed of two reflective mirrors. Accordingly, the light beam can be further folded for optical path design. In this embodiment, the light-emitting element 122 transmits the light beam L towards one of the reflective mirror groups 180, and the light beam L is sequentially reflected by the two reflective mirrors of the reflective mirror group 180, so that the light beam L reflected by the two reflective mirrors is transmitted along the first direction D1 and passes through the transmissive region A2 of the first beam-combining device 140. The light-emitting element 123 transmits the light beam L towards another one of the reflective mirror groups 180, and the light beam L is sequentially reflected by the two reflective mirrors of the reflective mirror group 180, so that the light beam L reflected by the two reflective mirrors is then transmitted along the first direction D1 and passes through the transmissive region A2 of the third beam-combining device 160. In this way, the second light source group 120 may be provided with a larger configuration and design space, thereby reducing the assembly difficulty and improving the heat dissipation effect.

As can be seen from the above description, in this embodiment, each of a light exiting surface S1 of the first light source group 110 and a light exiting surface S3 of the third light source group 130 is not parallel to a light exiting surface S2 of the second light source group 120. Specifically, the light exiting surface S1 of the first light source group 110 and the light exiting surface S3 of the third light source group 130 are respectively perpendicular to the light exiting surface S2 of the second light source group 120, and positions of the light-emitting elements 121, 122, 123 and 124 of the second light source group 120 in the first direction D1 do not overlap with the light-emitting elements 111, 112, 113 and 114 of the first light source group 110 and the light-emitting elements 131, 132, 133 and 134 of the third light source group 130, as shown by FIG. 3. In other words, light exiting directions of the first light source group 110 to the third light source group 130 are different, and the light beams L provided by the first light source group 110 and the third light source group 130 may be reflected by the first beam-combining device 140 to the fourth beam-combining device 170 so that the light beams L are transmitted along the first direction D1. Accordingly, the first light source group 110 to the third light source group 130 may be disposed at different positions in space to provide the light beams L, and the beams L may be transmitted along the first direction D1 by reflection or transmission effect of the first beam-combining device 140 to the fourth beam-combining device 170. As a result, the light source module 100 may take into account both good space utilization and good heat dissipation effect.

In addition, in this embodiment, a placing direction of a part of the light-emitting elements 121, 122, 123 and 124 is perpendicular to a placing direction of another part of the light-emitting elements 121, 122, 123 and 124 in the second light source group 120. Specifically, the placing direction of the light-emitting element 121 and the light-emitting element 124 is perpendicular to the placing direction of the light-emitting element 122 and the light-emitting element 123. That is, the long sides of the light-emitting element 121 and the light-emitting element 124 are perpendicular to the longs sides of the light-emitting element 122 and the light-emitting element 123. In this way, the space utilization of the plane on which the second light source group 120 is located may be improved, and the light beams L provided by the first light source group 110 to the third light source group 130 may be rounded to suit the shape of the lens, thereby improving the light usability efficiency.

Further, in this embodiment, the positions of the first beam-combining device 140 and the third beam-combining device 160 in the first direction D1 are alternately arranged and do not completely overlap, and the positions of the second beam-combining device 150 and the fourth beam-combining device 170 in the first direction D1 are alternately arranged and do not completely overlap. Specifically, in an embodiment, the positions of the first beam-combining device 140 and the third beam-combining device 160 in the first direction D1 may be misaligned and may partially overlap. That is, non-optical regions (regions that are not an optical travel path of the light beam L) of the first beam-combining device 140 and the third beam-combining device 160 in the first direction D1 may be controlled to overlap each other. Accordingly, the optical path is not affected. At the same time, a width of the non-optical area generated by the beam-combining device in the center may be further reduced to further reduce a volume of the beam-combining device and reduce the influence of mechanical part of the beam-combining device on the optical path. Accordingly, the optical quality of the light source module 100 may be improved. In another embodiment, the first beam-combining device 140 includes a first transparent substrate (not illustrated) and a first optical layer disposed on the first transparent substrate. The third beam-combining device 160 includes a third transparent substrate (not illustrated) and a third optical layer disposed on the third transparent substrate. Here, the first transparent substrate and the third transparent substrate in the first direction are alternately arranged and partially overlap at positions on which the first optical layer and the third optical layer are not located. Since the overlapping portions are the transparent portions of the substrate, the optical path will not be affected. At the same time, the overlapping portion where the first transparent substrate of the first beam-combining device 140 and the third transparent substrate of the third beam-combining device 160 are alternately arranged can be fixed together through a mechanism design to simplify the fixing mechanism. Meanwhile, the influence of the mechanism part of the beam-combining device on the optical path may be reduced, thereby improving the optical quality of the light source module 100. Similarly, with same design on the second beam-combining device 150 and the fourth beam-combining device 170, a second transparent substrate (not illustrated) of the second beam-combining device 150 and a fourth transparent substrate (not illustrated) of the fourth beam-combining device 170 in the first direction may be alternately arranged and may partially overlap at positions on which the second optical layer and the fourth optical layer are not located. The second transparent substrate of the second beam-combining device 150 and the fourth transparent substrate of the fourth beam-combining device 170 can be fixed together through a mechanism design to simplify the fixing mechanism.

Figure 2B:
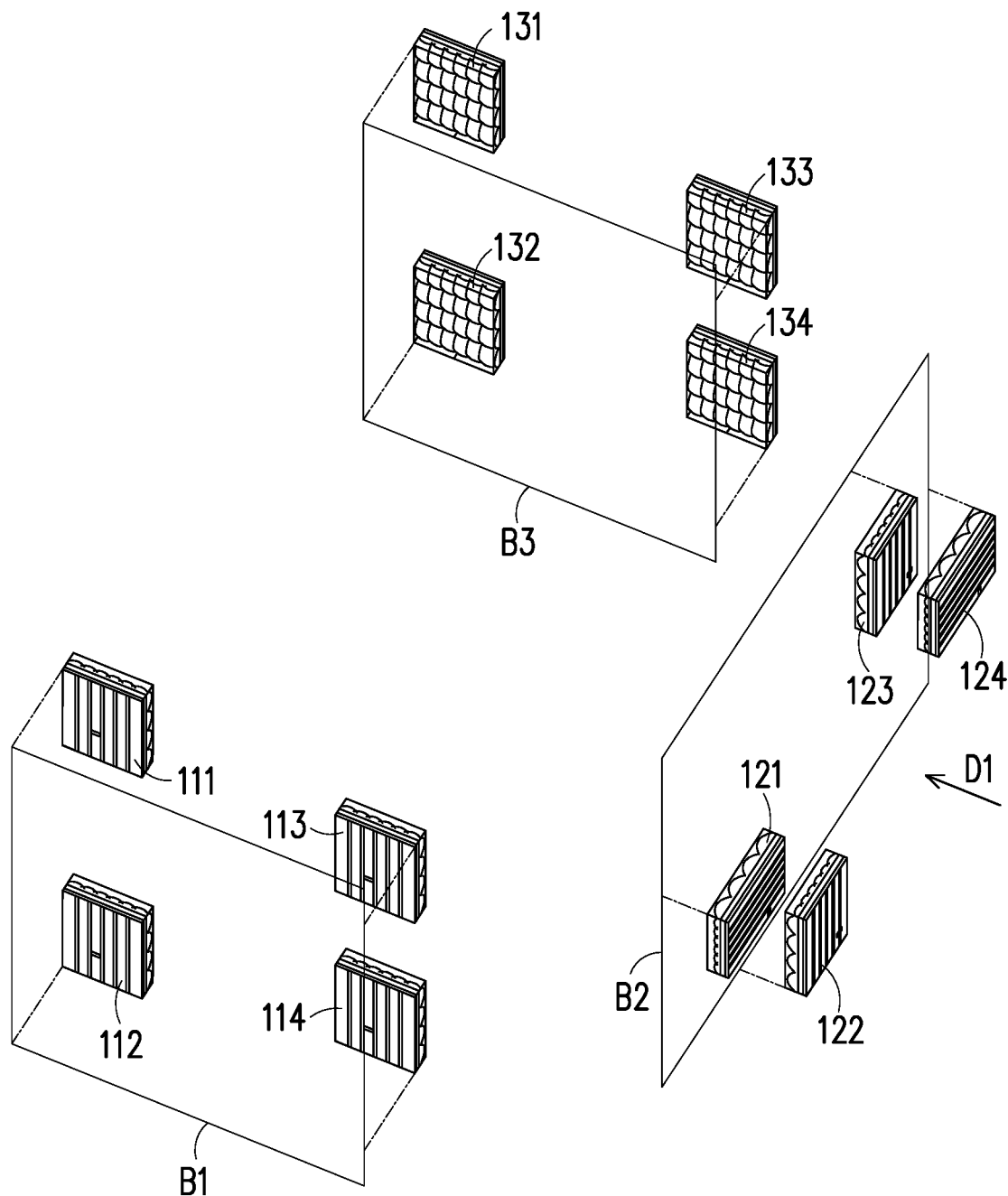
FIG. 2B is a 3D view of a part of FIG. 2A.

FIG. 2B is a 3D view of a part of FIG. 2A. Referring to FIG. 2B, it is worth noting that, in this embodiment, a maximum area B1 occupied by the light-emitting elements 111, 112, 113 and 114 of the first light source group 110, a maximum area B2 occupied by the light-emitting elements 121, 122, 123 and 124 of the second light source group 120 and a maximum area B3 occupied by the light-emitting elements 131, 132, 133 and 134 of the third light source group 130 differ from one another by a percentage less than or equal to five percent. In this way, the first light source group 110, the second light source group 120 and the third light source group 130 may share use of heat sinks with the same size so as to improve the assembly convenience and reduce the manufacturing costs.

Figure 6:
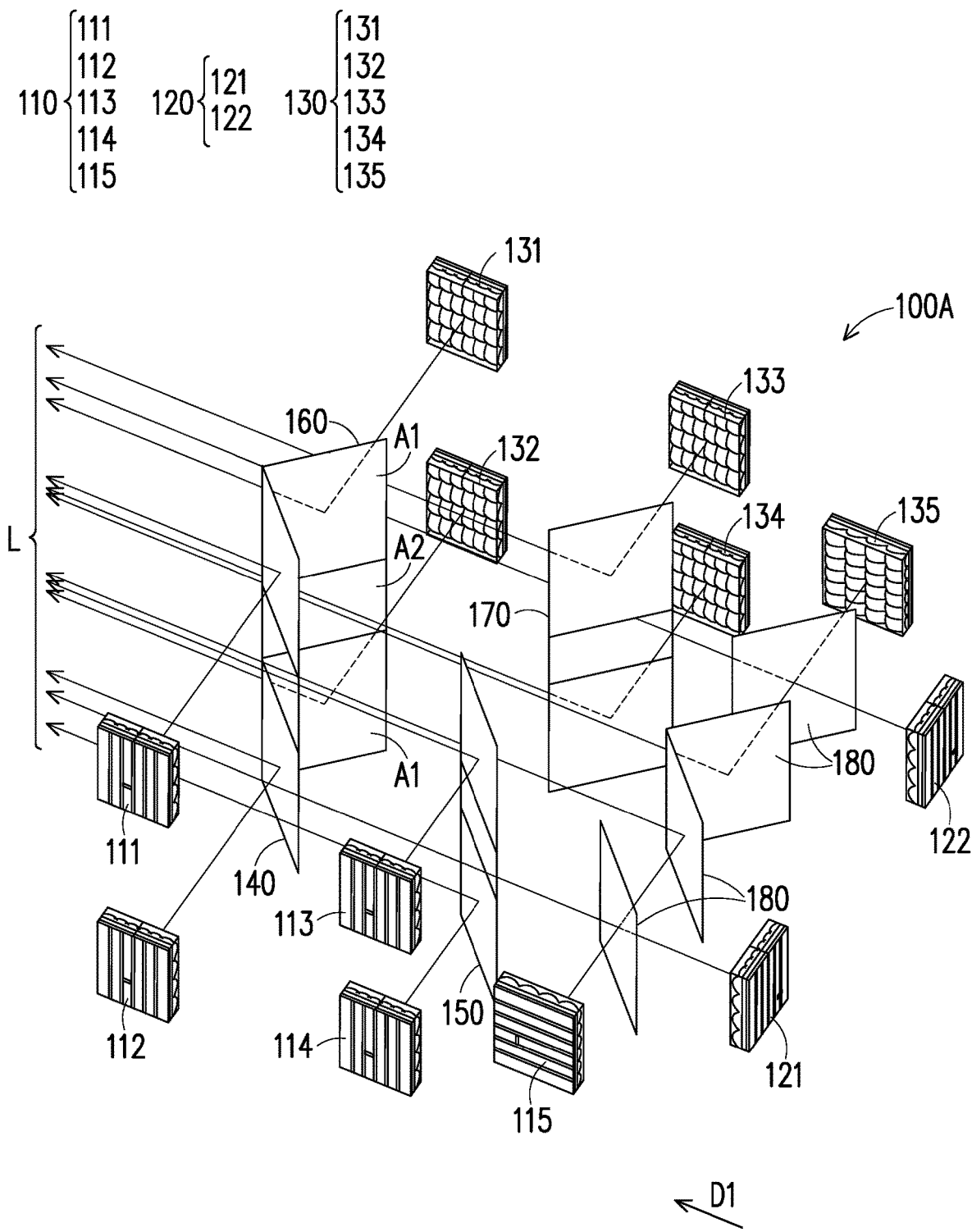
FIG. 6 is a 3D view of a light source module in another embodiment of the invention.
Figure 7:
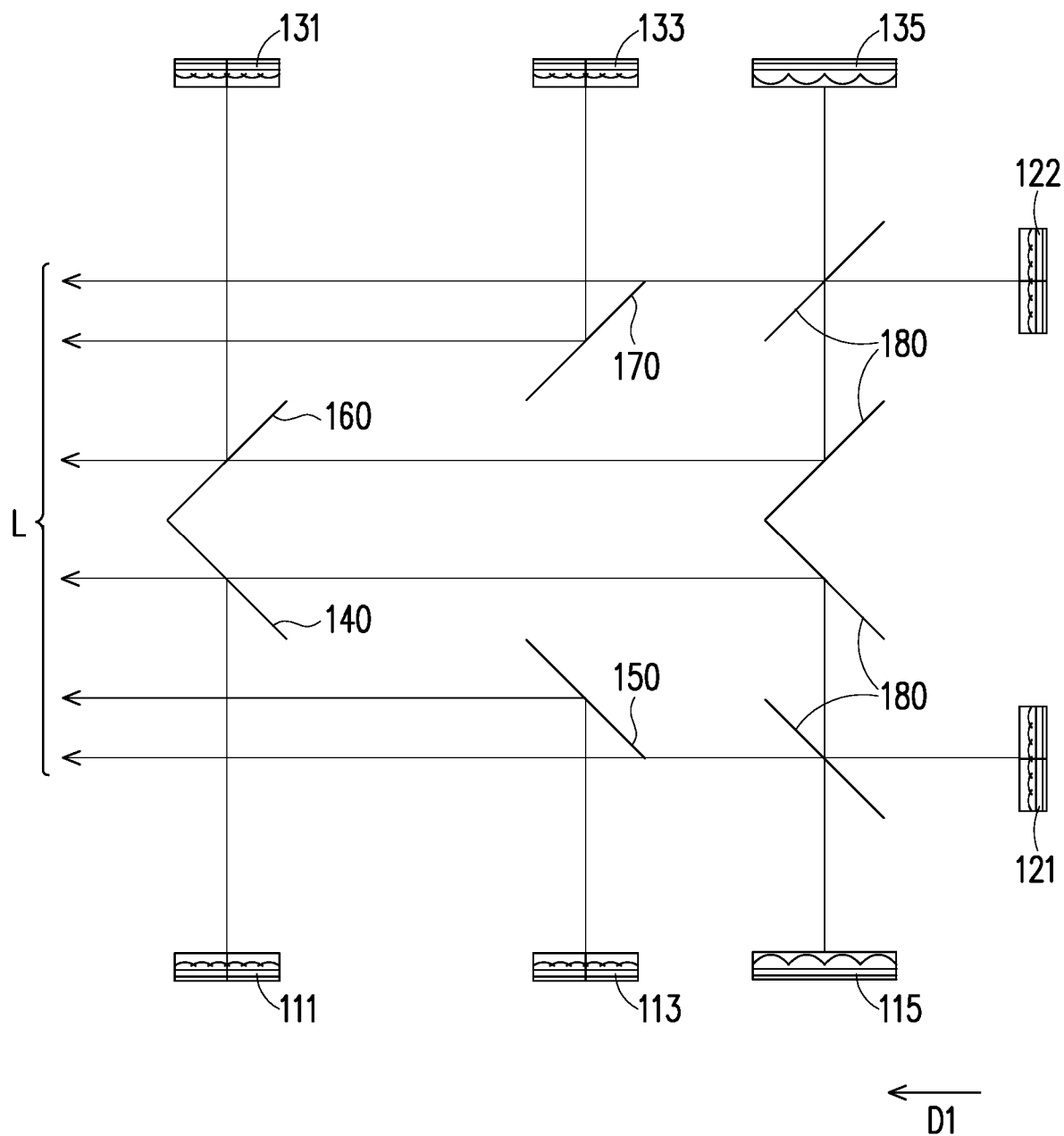
FIG. 7 is a top view of the light source module of FIG. 6.
Figure 8:
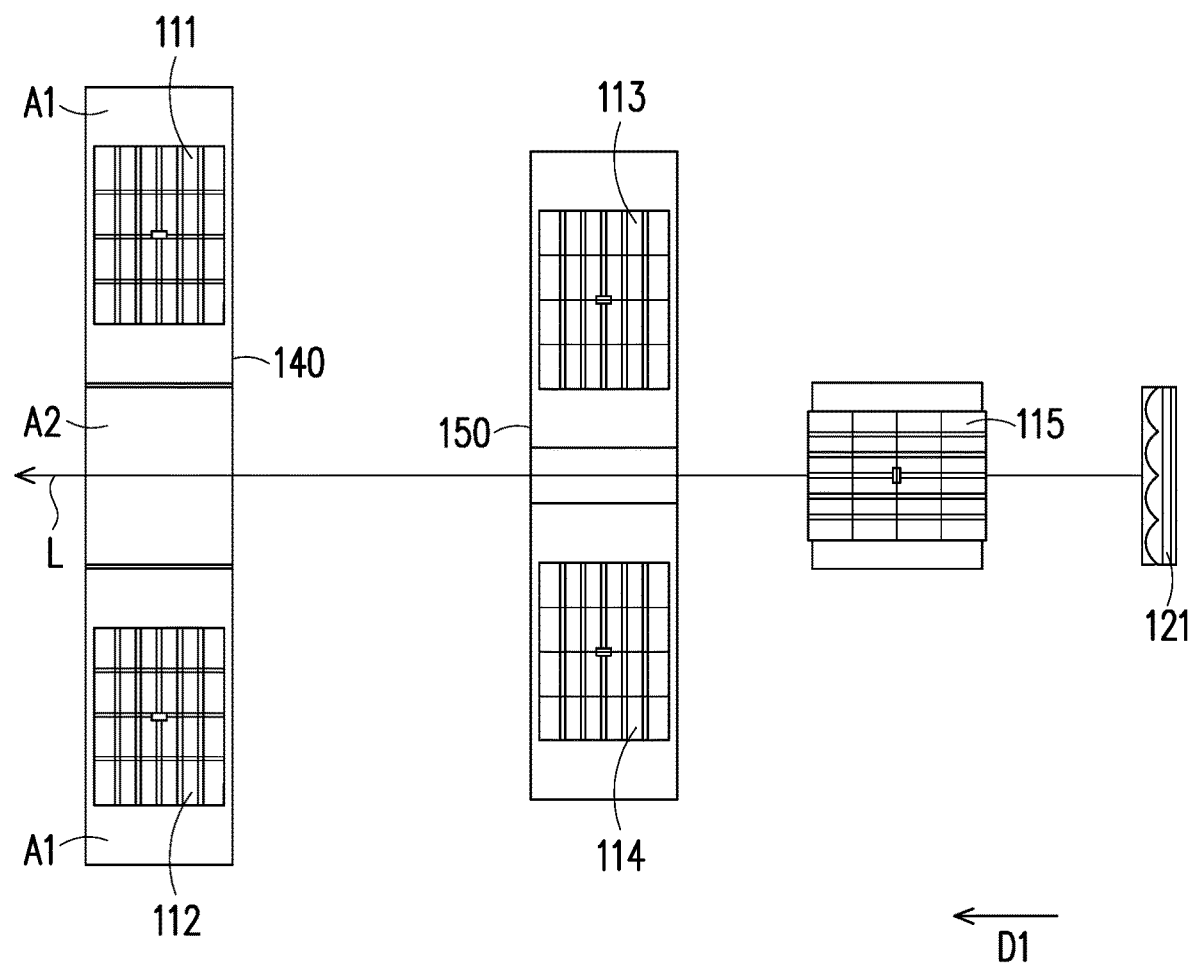
FIG. 8 is a side view of the light source module of FIG. 6.
Figure 9:
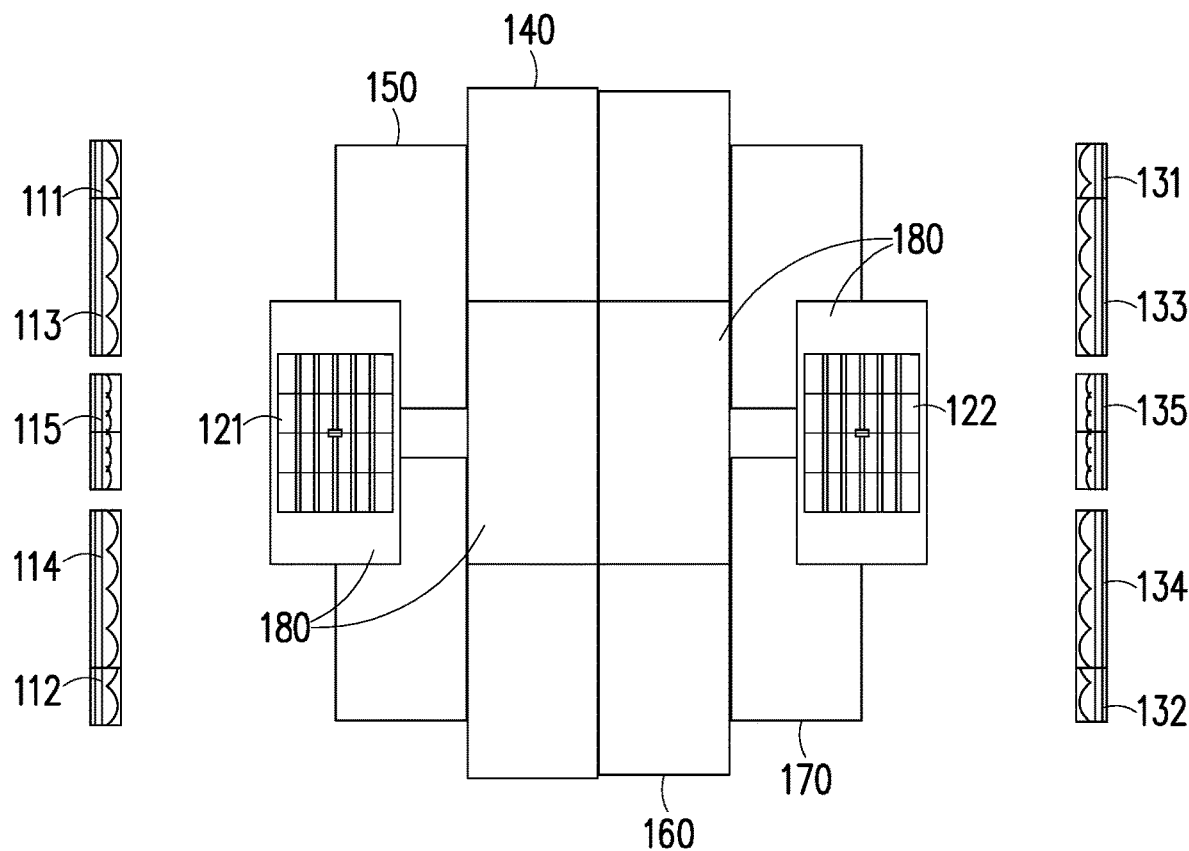
FIG. 9 is another side view of the light source module of FIG. 6.

FIG. 6 is a 3D view of a light source module in another embodiment of the invention. FIG. 7 is a top view of the light source module of FIG. 6. FIG. 8 is a side view of the light source module of FIG. 6. FIG. 9 is another side view of the light source module of FIG. 6. Referring to FIG. 6 to FIG. 9, a light source module 100A of the present embodiment is similar to the light source module 100 shown by FIG. 2. The difference between the two is that in this embodiment, the first light source group 110 of the light source module 100A further includes a light-emitting element 115, the third light source group 130 further includes a light-emitting element 135, and the second light source group 120 only includes two light-emitting elements 121 and 122.

Specifically, the light-emitting element 115 transmits the light beam L towards one of the reflective mirror groups 180, and the light beam L reflected by the reflective mirror group 180 is transmitted along the first direction D1 and passes through the transmissive region A2 of the second beam-combining device 150. The light-emitting element 135 transmits the light beam L towards another one of the reflective mirror groups 180, and the light beam L reflected by the reflective mirror group 180 is transmitted along the first direction D1 and passes through the transmissive region A2 of the fourth beam-combining device 170. In addition, the light-emitting element 121 transmits the light beam L towards one of the reflective mirror groups 180, and after being reflected twice by the reflective mirrors of the reflective mirror group 180, the light beam L is transmitted along the first direction D1 and passes through the transmissive region A2 of the first beam-combining device 140. The light-emitting element 122 transmits the light beam L towards another one of the reflective mirror groups 180, and after being reflected twice by the reflective mirrors of the reflective mirror group 180, the light beam L is transmitted along the first direction D1 and passes through the transmissive region A2 of the third beam-combining device 160. In this way, the second light source group 120 may be provided with a larger configuration and design space, thereby reducing the assembly difficulty and improving the heat dissipation effect.

Similar to the embodiment of FIG. 2A, in this embodiment, each of the light exiting surface S1 of the first light source group 110 and the light exiting surface S3 of the of the third light source group 130 is not parallel to the light exiting surface S2 of the second light source group 120. Specifically, the light exiting surface S1 of the first light source group 110 and the light exiting surface S3 of the third light source group 130 are respectively perpendicular to the light exiting surface S2 of the second light source group 120, and positions of the light-emitting elements 121, and 122 of the second light source group 120 in the first direction D1 do not overlap with the light-emitting elements 111, 112, 113, 114 and 115 of the first light source group 110 and the light-emitting elements 131, 132, 133, 134 and 135 of the third light source group 130, as shown by FIG. 7. In other words, light exiting directions of the first light source group 110 to the third light source group 130 are different, and the light beams L provided by the first light source group 110 and the third light source group 130 may be reflected by the first beam-combining device 140 to the fourth beam-combining device 170 and the reflective mirror group 180 and transmitted along the first direction D1. Accordingly, the first light source group 110 to the third light source group 130 may be disposed at different positions in space to provide the light beams L, and the beams L may be transmitted along the first direction D1 by reflection or transmission effect of the first beam-combining device 140 to the fourth beam-combining device 170. As a result, the light source module 100A may take into account both good space utilization and good heat dissipation effect.

In summary, the embodiments of the invention have at least one of the following advantages and effects. In the light source module and the projection device of the invention, the first light source group, the second light source group and the third light source group are respectively disposed on different planes in space, so that each of the light exiting surface of the first light source group and the light exiting surface of the third light source group is not parallel to the light exiting surface of the second light source group. Accordingly, the first light source group to the third light source group may be provide the light beams from different positions in space, and transmit the light beams along the first direction by reflection or transmission effect of the beam-combining devices. As a result, the light source module may take into account both good space utilization and good heat dissipation effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

The invention claimed is:

1. A light source module, wherein the light source module is configured to provide a light beam along a first direction, and the light source module comprises a first light source group to a third light source group and a first beam-combining device to a fourth beam-combining device, wherein:
    each of a light exiting surface of the first light source group and a light exiting surface of the third light source group is not parallel to a light exiting surface of the second light source group;
    an emitted light of the first light source group is transmitted along the first direction after being reflected by the first beam-combining device and the second beam-combining device;
    an emitted light of the third light source group is transmitted along the first direction after being reflected by the third beam-combining device and the fourth beam-combining device; and
    an emitted light of the second light source group is transmitted along the first direction and passes through the first beam-combining device and the third beam-combining device,
    wherein each of the first light source group, the second light source group and the third light source group comprises a plurality of light-emitting elements, and positions of the light-emitting elements of the second light source group in the first direction do not overlap with the light-emitting elements of the first light source group and the light-emitting elements of the third light source group.

2. The light source module according to claim 1, wherein a maximum area occupied by the light-emitting elements of the first light source group, a maximum area occupied by the light-emitting elements of the second light source group and a maximum area occupied by the light-emitting elements of the third light source group differ from one another by a percentage less than or equal to five percent.

3. The light source module according to claim 1, wherein a placing direction of a part of the light-emitting elements is perpendicular to a placing direction of another part of the light-emitting elements in the second light source group.

4. The light source module according to claim 1, wherein a number of the light-emitting elements included by each of the first light source group, the second light source group and the third light source group is 2 to 6, and a total number of the light-emitting elements of the first light source group to the third light source group is 12.

5. The light source module according to claim 1, wherein projection positions of the first beam-combining device and the third beam-combining device on a reference plane perpendicular to the first direction are located between projection positions of the second beam-combining device and the fourth beam-combining device on the reference plane.

6. The light source module according to claim 1, wherein positions of the first beam-combining device and the third beam-combining device in the first direction do not completely overlap.

7. The light source module according to claim 1, wherein positions of the second beam-combining device and the fourth beam-combining device in the first direction do not completely overlap.

8. The light source module according to claim 1, wherein each of the first beam-combining device to the fourth beam-combining device comprises two reflective regions and a transmissive region, and the transmissive region is located between the two reflective regions, wherein the two reflective regions are configured to reflect the emitted light of the first light source group or the third light source group, and the transmissive region is configured to allow the emitted light of the second light source group to be transmitted through.

9. The light source module according to claim 1, wherein the light source module further comprises two reflective mirror groups, configured to fold at least a part of the emitted light of the second light source group.

10. A projection device, wherein the projection device comprises at least one light source module, an optical system, at least one light valve and a projection lens, wherein
    at least one light source module is configured to provide a light beam along a first direction, and comprises a first light source group to a third light source group and a first beam-combining device to a fourth beam-combining device, wherein:
        each of a light exiting surface of the first light source group and a light exiting surface of the third light source group is not parallel to a light exiting surface of the second light source group;
        an emitted light of the first light source group is transmitted along the first direction after being reflected by the first beam-combining device and the second beam-combining device;
        an emitted light of the third light source group is transmitted along the first direction after being reflected by the third beam-combining device and the fourth beam-combining device; and
        an emitted light of the second light source group is transmitted along the first direction and passes through the first beam-combining device and the third beam-combining device;
    the optical system is disposed on transmission paths of the light beams, and configured to convert the light beams into an illumination beam;
    the at least one light valve is disposed on a transmission path of the illumination beam and configured to convert the illumination beam into an image beam; and
    the projection lens is disposed on a transmission path of the image beam and configured to convert the image beam into a projection beam,
    wherein each of the first light source group, the second light source group and the third light source group comprises a plurality of light-emitting elements, and positions of the light-emitting elements of the second light source group in the first direction do not overlap with the light-emitting elements of the first light source group and the light-emitting elements of the third light source group.

11. The projection device according to claim 10, wherein a maximum area occupied by the light-emitting elements of the first light source group, a maximum area occupied by the light-emitting elements of the second light source group and a maximum area occupied by the light-emitting elements of the third light source group differ from one another by a percentage less than or equal to five percent.

12. The projection device according to claim 10, wherein a placing direction of a part of the light-emitting elements is perpendicular to a placing direction of another part of the light-emitting elements in the second light source group.

13. The projection device according to claim 10, wherein a number of the light-emitting elements included by each of the first light source group, the second light source group and the third light source group is 2 to 6, and a total number of the light-emitting elements of the first light source group to the third light source group is 12.

14. The projection device according to claim 10, wherein projection positions of the first beam-combining device and the third beam-combining device on a reference plane perpendicular to the first direction are located between projection positions of the second beam-combining device and the fourth beam-combining device on the reference plane.

15. The projection device according to claim 10, wherein positions of the first beam-combining device and the third beam-combining device in the first direction do not completely overlap.

16. The projection device according to claim 10, wherein positions of the second beam-combining device and the fourth beam-combining device in the first direction do not completely overlap.

17. The projection device according to claim 10, wherein each of the first beam-combining device to the fourth beam-combining device comprises two reflective regions and a transmissive region, and the transmissive region is located between the two reflective regions, wherein the two reflective regions are configured to reflect the emitted light of the first light source group or the third light source group, and the transmissive region is configured to allow the emitted light of the second light source group to be transmitted through.

18. The projection device according to claim 10, wherein the at least one light source module further comprises two reflective mirror groups, configured to fold at least a part of the emitted light of the second light source group.

\* \* \* \* \*